United States Patent
Iyer et al.

(10) Patent No.: US 9,754,588 B2
(45) Date of Patent: Sep. 5, 2017

(54) METHOD AND APPARATUS FOR VOICE CONTROL USER INTERFACE WITH DISCREET OPERATING MODE

(71) Applicant: Motorola Mobility LLC, Chicago, IL (US)

(72) Inventors: Boby Iyer, Elmhurst, IL (US); Kevin O Foy, Chicago, IL (US)

(73) Assignee: Motorola Mobility LLC, Chicago, IL (US)

(*) Notice: Subject to any disclaimer, the term of this patent is extended or adjusted under 35 U.S.C. 154(b) by 89 days.

(21) Appl. No.: 14/810,892

(22) Filed: Jul. 28, 2015

(65) Prior Publication Data

US 2016/0253998 A1 Sep. 1, 2016

Related U.S. Application Data

(63) Continuation-in-part of application No. 14/631,924, filed on Feb. 26, 2015.

(51) Int. Cl.
*G10L 21/00* (2013.01)
*G10L 17/00* (2013.01)
(Continued)

(52) U.S. Cl.
CPC .............. *G10L 15/22* (2013.01); *G06F 3/017* (2013.01); *G06F 3/167* (2013.01);
(Continued)

(58) Field of Classification Search
None
See application file for complete search history.

(56) References Cited

U.S. PATENT DOCUMENTS 6,925,296 B2* 8/2005 Mattisson ........... H04M 1/6016
367/118
7,263,373 B2* 8/2007 Mattisson ............. H04M 1/605
367/118
(Continued)

FOREIGN PATENT DOCUMENTS

WO WO-2014/163284 5/2011

OTHER PUBLICATIONS

Singh, Satwant "NonFinal OA", U.S. Appl. No. 14/631,924, filed Feb. 26, 2015; dated Apr. 8, 2016.
(Continued)

*Primary Examiner* — Satwant Singh
(74) *Attorney, Agent, or Firm* — Philip H. Burrus, IV

(57) ABSTRACT

An electronic device includes a voice control interface engine operative in a first mode to receive a speech command, through a microphone, from a first distance and produce, through a loudspeaker and in response to the speech command, an audible output at a first output level. One or more processors are operable with one or more proximity sensors to detect objects proximately located with a housing of the electronic device. Where there are none, a timer can be initiated. Upon expiration of the timer, the one or more processors can then transition the voice control interface engine to a second mode operative to receive the speech command from a second distance and produce, in response to the speech command, the audible output at a second output level, where the second distance is greater than the first distance and the second output level is greater than the first output level.

20 Claims, 11 Drawing Sheets

(51) Int. Cl.
*G10L 15/00* (2013.01)
*G10L 15/04* (2013.01)
*G10L 15/22* (2006.01)
*H04M 1/725* (2006.01)
*G06F 3/16* (2006.01)
*G06F 3/01* (2006.01)

(52) U.S. Cl.
CPC .... *H04M 1/72569* (2013.01); *H04M 2250/12* (2013.01); *H04M 2250/74* (2013.01)

(56) References Cited

U.S. PATENT DOCUMENTS

| | | | |
|---|---|---|---|
| 9,183,806 B2 | 11/2015 | Felt | |
| 9,311,898 B2 | 4/2016 | Ward | |
| 9,530,418 B2* | 12/2016 | Bae | G10L 21/00 |
| 2006/0085183 A1 | 4/2006 | Jain | |
| 2006/0270450 A1 | 11/2006 | Garratt et al. | |
| 2008/0243281 A1 | 10/2008 | Kadaba et al. | |
| 2011/0313768 A1 | 12/2011 | Klein | |
| 2013/0076990 A1 | 3/2013 | Kim et al. | |
| 2013/0260839 A1 | 10/2013 | Moquin | |
| 2013/0293503 A1 | 11/2013 | Zhou | |
| 2014/0223477 A1 | 8/2014 | Han et al. | |
| 2014/0278443 A1 | 9/2014 | Gunn et al. | |
| 2015/0135078 A1 | 5/2015 | Erkkila | |
| 2015/0148106 A1 | 5/2015 | Choi | |
| 2016/0077794 A1* | 3/2016 | Kim | G06F 3/167 704/275 |
| 2016/0086600 A1* | 3/2016 | Bauer | G10L 15/16 704/202 |
| 2016/0202871 A1 | 7/2016 | Ward | |

OTHER PUBLICATIONS

"Great Britain Search Report", Application No. GB1603200.5; GB Search Report; dated Aug. 15, 2016.

"Notice of Allowance", U.S. Appl. No. 14/631,924, filed Feb. 26, 2015; dated Aug. 29, 2016.

* cited by examiner

METHOD AND APPARATUS FOR VOICE CONTROL USER INTERFACE WITH DISCREET OPERATING MODE

CROSS REFERENCE TO PRIOR APPLICATIONS

This application is a continuation-in-part of U.S. application Ser. No. 14/631,924, filed Feb. 27, 2015, attorney docket No. MM01221, which is incorporated by reference for all purposes.

BACKGROUND

Technical Field

This disclosure relates generally to electronic devices and corresponding methods, and more particularly to electronic devices with voice recognition systems.

Background Art

Mobile electronic communication devices, such as mobile telephones, smart phones, gaming devices, and the like, are used by billions of people. These owners use mobile communication devices for many different purposes including, but not limited to, voice communications and data communications for text messaging, Internet browsing, commerce such as banking, and social networking.

As the technology of these devices has advanced, so too has their feature set. For example, not too long ago all electronic devices had physical keypads. Today touch sensitive displays are more frequently seen as user interface devices. Similarly, it used to be that the only way to deliver user input to a device was with touch, either through a keypad or touch sensitive display. Today some devices are equipped with voice recognition that allows a user to speak commands to a device instead of typing them.

Unforeseen problems sometimes accompany technological advance. Illustrating by example, when near-field wireless devices such as hands-free headsets first appeared, people began conducting telephone calls through a small, wireless earbud device while their mobile phone was in a bag or pocket. To the innocent observer, it looked as if these technologically advanced people were instead crazy since they talked aloud to—what appeared to be—themselves. Some early adopters continued to hold their mobile phones in their hands, albeit unnecessary, just to show passersby that they were indeed conducting a telephone call as opposed to ranting to the air.

It would be advantageous to have additional solutions, in the form of an improved apparatus, an improved method, or both, to these unforeseen problems resulting from technological advances occurring in electronic devices.

Figure 1:
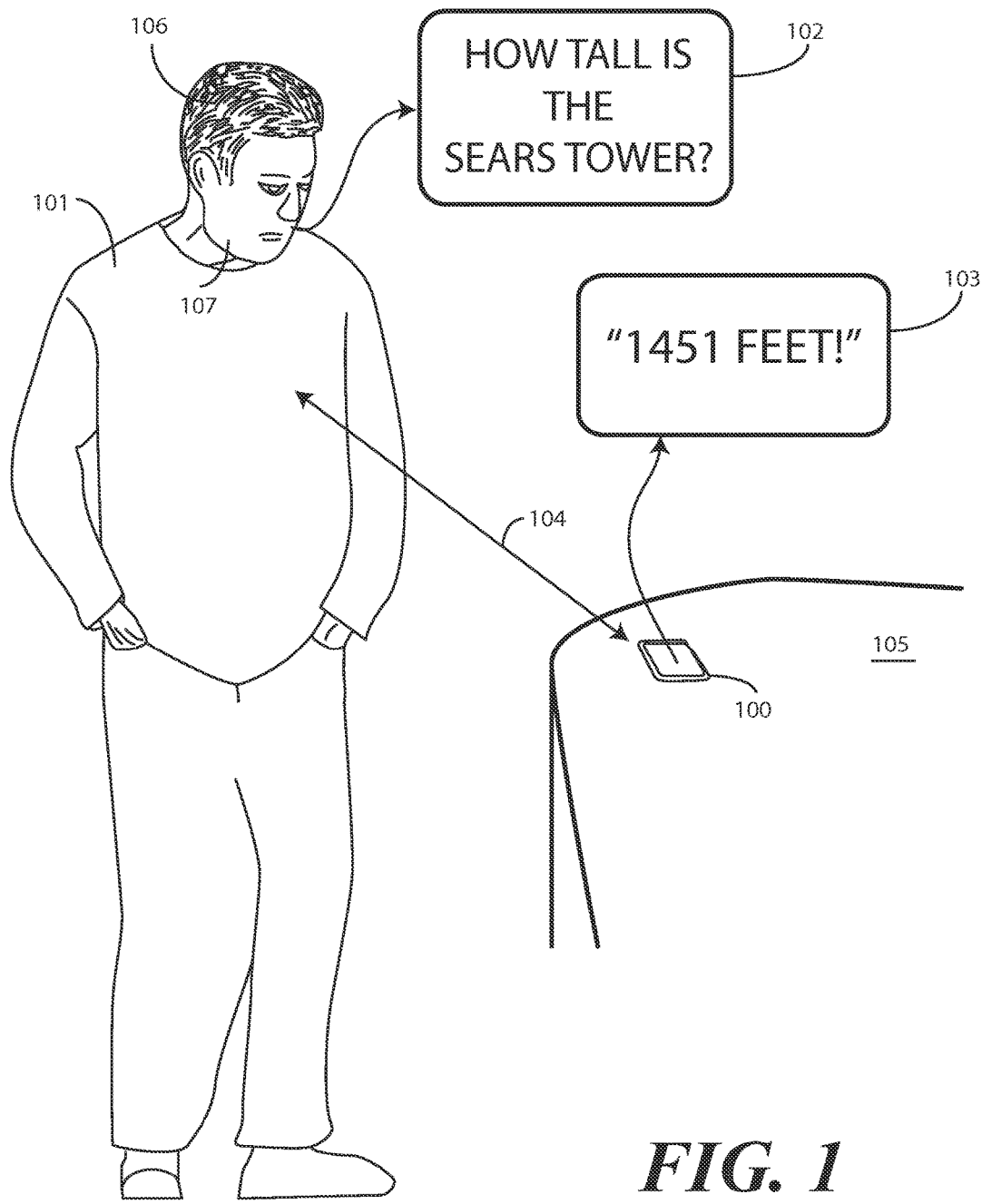
FIG. 1 illustrates a user interacting with a prior art electronic device having voice recognition capabilities.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to transitioning a voice control interface engine of an electronic device from a first mode, where voice commands can be received from a first distance and audible output returned at a first output level, to a second mode where voice commands are received from only a second distance and audible output is delivered at a second output level. Embodiments also relate to the reverse process, namely transitioning back from the second mode to the first mode. Process descriptions or blocks in a flow chart can be modules, segments, or portions of code that implement specific logical functions of a machine or steps in a process, or alternatively that transition specific hardware components into different states or modes of operation. Alternate implementations are included, and it will be clear that functions may be executed out of order from that shown or discussed, including substantially concurrently or in reverse order, depending on the functionality involved.

It will be appreciated that embodiments of the disclosure described herein may be comprised of one or more conventional processors and unique stored program instructions that control the one or more processors to implement, in conjunction with certain non-processor circuits, some, most, or all of the functions of transitioning a voice control interface engine of an electronic device back and forth between a first mode and a second mode of operation as described herein. The non-processor circuits may include, but are not limited to, microphones, loudspeakers, acoustic amplifiers, digital to analog converters, signal drivers, clock circuits, power source circuits, and user input devices. As such, these functions may be interpreted as steps of a method to perform the transition of a voice control interface engine between a first mode and a second mode of operation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by reducing power consumption, extending run time, and improving the overall user experience to overcome problems specifically arising in the realm of the technology associated with electronic device user interaction.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods and apparatuses for transitioning a voice control interface engine operating in an electronic device back and forth between a normal mode of operation and a discreet mode of operation. In one embodiment, a voice control interface engine is operable to receive voice commands and deliver audible responses to a user. For example, the voice control interface engine can receive a speech command in which a user asks a question. The electronic device may then search the Internet for the answer and, in response to receiving the speech command, deliver an audible output to the user with the answer.

Embodiments of the disclosure contemplate that one unforeseen consequence of voice recognition systems is that a user may not want passersby to hear the audible output. This is especially true when the audible output includes an enunciation of personal information. With this unforeseen problem in mind, embodiments of the disclosure advantageously provide a method and system to cause the voice control interface engine to inter a second, "discreet" mode of operation. At the same time, the user may only require the discreet mode of operation for a limited time. Accordingly, embodiments of the disclosure also provide methods for transitioning out of the discreet mode back into the normal mode of operation as well.

In one embodiment, a voice control interface engine operating in an electronic device is operative in a first mode. The first mode, in one embodiment, is a normal mode of operation or a default mode of operation. When operating in this mode, the voice control interface engine is operable to receive a speech command, through a microphone, from a first distance. The voice control interface engine is then to produce, through a loudspeaker and in response to the speech command, an audible output at a first output level. Illustrating by example, the voice control interface engine may be operable to receive voice commands from a user standing two, three, or more feet away in a "speakerphone" format and then deliver the audible output to a loudspeaker at a level sufficient for the user to hear it from the same distance.

One or more processors, which can be operable with one or more sensors, also function within the electronic device. In one embodiment, the one or more processors are operable with the one or more sensors to detect a predefined user input. Examples of the predefined user input include a predefined motion of the electronic device, a predefined gesture input, predefined keywords delivered as audible input, detection of a user's head becoming proximately located with the electronic device, or actuation of a user actuation target of the electronic device. In one embodiment, when this occurs the one or more processors are operable to transition the voice control interface engine to a second mode operative to receive the speech command from a second distance and produce, in response to the speech command, the audible output at a second output level. In one embodiment the second distance is less than the first distance and the second output level is less than the first output level. This second mode of operation, i.e., the discreet mode, allows the user to deliver voice commands with a much lower volume and receive responses at a level that others will not overhear. For instance, when in the discreet mode of operation, the user may whisper voice commands to the microphone, while hearing audible responses from an earpiece speaker rather than a loudspeaker.

Turning now to FIG. 1, illustrated therein is a prior art electronic device 100 configured with a voice controlled user interface. One example of such a prior art electronic device 100 is described US Published Patent Application No. 2014/0278443 to Gunn et al., which is incorporated herein by reference. Essentially, the prior art electronic device 100 includes a voice controlled user interface to receive a speech command phrase, identify a speech command phrase segment, and perform a control operation in response to the segment. In one embodiment, the control operation is the delivery of an audible response.

FIG. 1 illustrates a use case that highlights an unforeseen problem associated with the otherwise incredibly convenient functionality offered by the voice controlled user interface. A user 101 delivers, in a normal conversational tone, a voice command 102 that asks, "How tall is the Sears Tower?" The prior art electronic device 100, using its voice controlled user interface and one or more other applications, retrieves the answer from a remote source and announces the answer with an audible output 103. In this case, the prior art electronic device announces, at a volume level sufficient for the user 101 to hear it from several feet away, "Fourteen hundred and fifty one feet."

Two things are of note in FIG. 1. First, due to the convenience offered by the voice controlled user interface, the user 101 has been able to determine a trivial fact simply by speaking. The user 101 did not have to access a book, computer, or other person. The prior art electronic device 100 simply found the answer and delivered it.

Second, the audible output 103 was delivered at an output level that was sufficient for the user 101 to hear it from a distance away. Embodiments of the disclosure contemplate that if the user 101 was able to hear it from a few feet away, so too would a passerby or eavesdropper. Embodiments of the disclosure contemplate that the user 101 may not care if a third party listens in on the answer to the question, "How tall is the Sears Tower?" However, if the user's voice command had been "play me my voice mail," the user 101 may not want a third party to hear their doctor giving a medical diagnosis. Similarly, the user 101 may not want a third party to hear their significant other breaking up with them or using expletives after they forgot an anniversary. Advantageously, embodiments of the disclosure provide an apparatus and method for transitioning a voice control interface engine into a second, discreet mode of operation where the medical diagnosis, breakup, or expletives are heard only by the person for whom they were intended.

Figure 2:
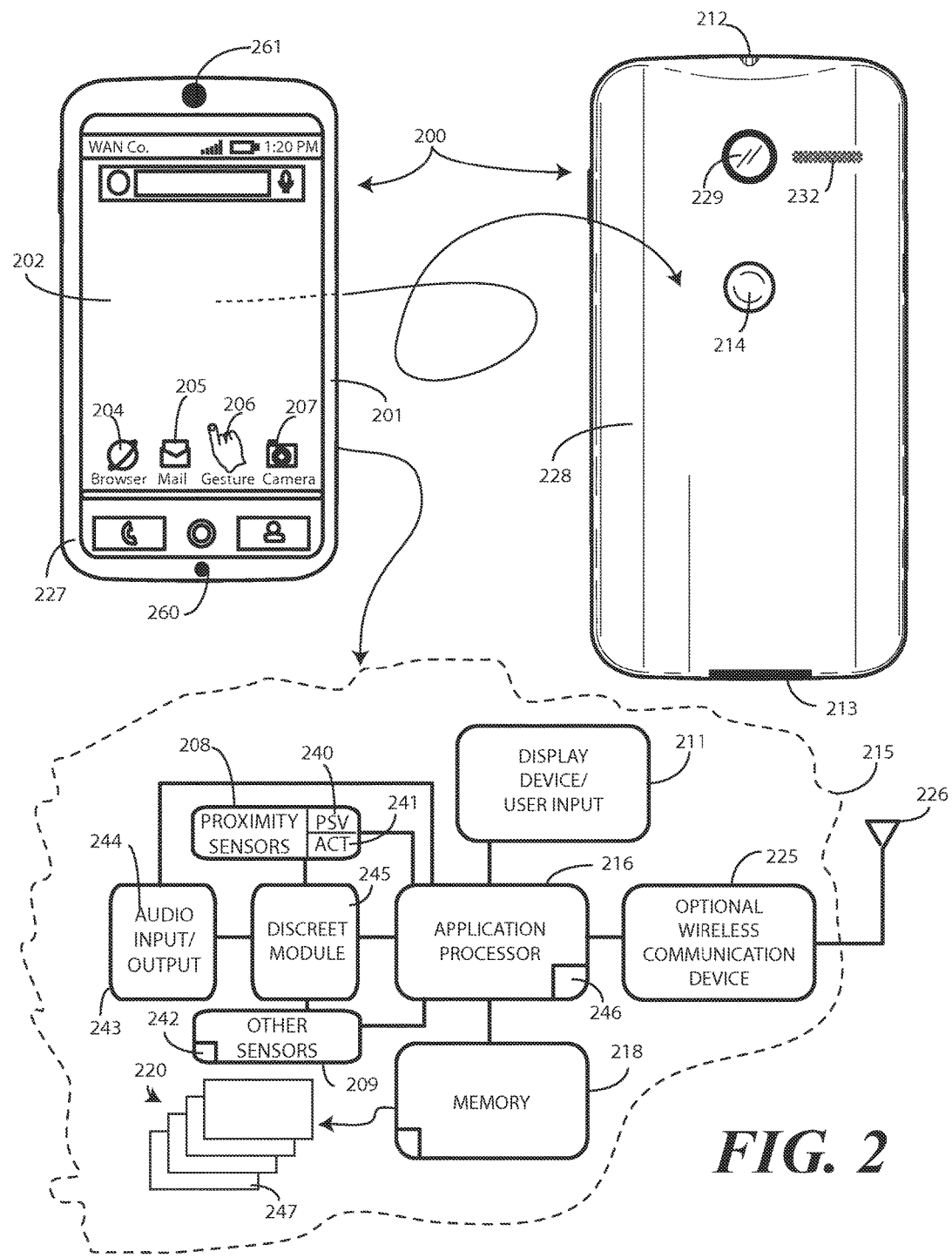
FIG. 2 illustrates a schematic block diagram of one explanatory electronic device in accordance with one or more embodiments of the disclosure.

Turning now to FIG. 2, illustrated therein is one explanatory electronic device 200 configured in accordance with one or more embodiments of the disclosure. The electronic device 200 of FIG. 2 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 200 could equally be a palm-top computer, a tablet computer, a gaming device, a media player, or other device.

This illustrative electronic device 200 includes a display 202, which may optionally be touch-sensitive. In one embodiment where the display 202 is touch-sensitive, the display 202 can serve as a primary user interface 211 of the electronic device 200. Users can deliver user input to the display 202 of such an embodiment by delivering touch input from a finger, stylus, or other objects disposed proximately with the display. In one embodiment, the display 202 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 2 includes a housing 201. In one embodiment, the housing 201 includes two housing members. A front housing member 227 is disposed about the periphery of the display 202 in one embodiment. A rear-housing member 228 forms the backside of the electronic device 200 in this illustrative embodiment and defines a rear major face of the electronic device. Features can be incorporated into the housing members 227,228. Examples of such features include an optional camera 229 or an optional speaker port 232 disposed atop a loudspeaker. These features are shown being disposed on the rear major face of the electronic device 200 in this embodiment, but could be located elsewhere. In this illustrative embodiment, a user interface component, which may be a button 214 or touch sensitive surface, can also be disposed along the rear-housing member 228.

In one embodiment, the electronic device 200 includes one or more connectors 212,213, which can include an analog connector, a digital connector, or combinations thereof. In this illustrative embodiment, connector 212 is an analog connector disposed on a first edge, i.e., the top edge, of the electronic device 200, while connector 213 is a digital connector disposed on a second edge opposite the first edge, which is the bottom edge in this embodiment.

A block diagram schematic 215 of the electronic device 200 is also shown in FIG. 2. In one embodiment, the electronic device 200 includes one or more processors 216. In one embodiment, the one or more processors 216 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the electronic device 200. Each of the application processor and the auxiliary processor(s) can be configured to process and execute executable software code to perform the various functions of the electronic device 200. A storage device, such as memory 218, can optionally store the executable software code used by the one or more processors 216 during operation.

In this illustrative embodiment, the electronic device 200 also includes a communication circuit 225 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 225 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 225 can include wireless communication circuitry, one of a receiver, a transmitter, or transceiver, and one or more antennas 226.

In one embodiment, the one or more processors 216 can be responsible for performing the primary functions of the electronic device 200. For example, in one embodiment the one or more processors 216 comprise one or more circuits operable with one or more user interface devices, which can include the display 202, to present presentation information to a user. The executable software code used by the one or more processors 216 can be configured as one or more modules 220 that are operable with the one or more processors 216. Such modules 220 can store instructions, control algorithms, logic steps, and so forth.

In one embodiment, one or more proximity sensors 208 can be operable with the one or more processors 216. In one embodiment, the one or more proximity sensors 208 include one or more proximity sensor components 240. The proximity sensors 208 can also include one or more proximity detector components 241. In one embodiment, the proximity sensor components 240 comprise only signal receivers. By contrast, the proximity detector components 241 include a signal receiver and a corresponding signal transmitter.

While each proximity detector component 241 can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components 241 comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components 241 can have signal receivers that receive similar wavelengths, i.e., about 860 nanometers.

In one or more embodiments the proximity sensor components 240 have a longer detection range than do the proximity detector components 241 due to the fact that the proximity sensor components detect heat directly emanating from a thermal object such as a person's body (as opposed to reflecting off the person's body) while the proximity detector components rely upon reflections of infrared light emitted from the signal transmitter. For example, the proximity sensor component 240 may be able to detect a thermal object such as a person's body via emitted heat from a distance of about ten feet, while the signal receiver of the proximity detector component 241 may only be able to detect reflected signals from the transmitter at a distance of about one to two feet.

In one embodiment, the proximity sensor component 240 comprises an infrared signal receiver so as to be able to detect infrared emissions from a thermal object such as a person or a portion of a person. Accordingly, the proximity sensor component 240 requires no transmitter since objects disposed external to the housing deliver emissions that are received by the infrared receiver. As no transmitter is required, each proximity sensor component 240 can operate at a very low power level. Evaluations conducted show that a group of infrared signal receivers can operate with a total current drain of just a few microamps (~10 microamps per sensor). By contrast, a proximity detector component 241, which includes a signal transmitter, may draw hundreds of microamps to a few milliamps.

In one embodiment, one or more proximity detector components 241 can each include a signal receiver and a corresponding signal transmitter. The signal transmitter can transmit a beam of infrared light that reflects from a nearby object and is received by a corresponding signal receiver. The proximity detector components 241 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals. The reflected signals can also be used to receive user input from a user delivering touch or gesture input to the electronic device 200.

In one embodiment, the one or more processors 216 may generate commands or execute control operations based on information received from one or more proximity sensors 208. The one or more processors 216 may also generate commands or execute control operations based upon information received from a combination of the one or more proximity sensors 208 and one or more other sensors 209. Alternatively, the one or more processors 216 can generate commands or execute control operations based upon information received from the one or more other sensors 209 alone. Moreover, the one or more processors 216 may process the received information alone or in combination with other data, such as the information stored in the memory 218.

The one or more other sensors 209 may include a microphone 260, a earpiece speaker 261, a second loudspeaker (disposed beneath speaker port 232), and a mechanical input component such as button 214. The one or more other sensors 209 may also include key selection sensors, a touch pad sensor, a touch screen sensor, a capacitive sensor, and one or more switches. Touch sensors may used to indicate whether any of the user actuation targets 204,205,206,207 on present on the display 202 are being actuated. Alternatively, touch sensors in the housing 201 can be used to determine whether the electronic device 200 is being touched at side edges, thus indicating whether certain orientations or movements of the electronic device 200 are being performed by a user. The other sensors 209 can also include surface/housing capacitive sensors, audio sensors, and video sensors (such as a camera).

The other sensors 209 can also include motion detectors 242, such as accelerometers or gyroscopes. For example, an accelerometer may be embedded in the electronic circuitry of the electronic device 200 to show vertical orientation, constant tilt and/or whether the device is stationary. The motion detectors 242 are also operable to detect movement of the electronic device 200 by a user. In one or more embodiments, the other sensors 209 and the motion detectors 242 can each be used as a gesture detection device. Illustrating by example, in one embodiment a user can deliver gesture input by moving a hand or arm in predefined motions in close proximity to the electronic device 200. In another embodiment, the user can deliver gesture input by touching the display 202. In yet another embodiment, a user can deliver gesture input by shaking or otherwise deliberately moving the electronic device 200. Other modes of delivering gesture input will be obvious to those of ordinary skill in the art having the benefit of this disclosure.

Other components operable with the one or more processors 216 can include output components 243 such as video outputs, audio outputs 244, and/or mechanical outputs. Examples of output components include audio outputs 244 such as speaker port 232, earpiece speaker 261, or other alarms and/or buzzers and/or a mechanical output component such as vibrating or motion-based mechanisms.

In one embodiment, the electronic device 200 includes a timer 246 that is operable with the one or more processors 216. The timer 246 can be integrated into the one or more processors 216, or can be a standalone device. In one embodiment, the one or more processors 216 are operable to establish a timer duration during which the timer 246 will count. Once the timer 246 has counted through the timer duration, it expires, thereby sending an alert to the one or more processors 216 that the timer duration has lapsed. For example, where the timer duration is set to five seconds, the timer 246 would—at the initiation of the one or more processors—count through five seconds. At the end of five seconds, the timer 246 would deliver an alert to the one or more processors 216 that the five seconds had passed. In such a mode of operation, the timer 246 essentially works as an egg timer in that it is set to a certain time, started, and delivers an alert when the certain time to which it was set expires.

In one or more embodiments, the one or more processors 216 can start the timer 246 in response to various actions. For example, in one embodiment when a user stops interacting with the voice control interface engine 245, the one or more processors 216 can initiate the timer 246. In another embodiment, when the one or more processors 216 detect removal of an object from a location proximately disposed with the housing 201 of the electronic device 200, the one or more processors 216 can initiate the timer 246. Examples of these cases will be explained in more detail below. Other stimuli from which the one or more processors 216 might start the timer 246 will be obvious to those of ordinary skill in the art having the benefit of this disclosure.

In one or more embodiments, when the timer 246 expires, the one or more processors 216 can transition the voice control interface engine 245 between the first mode of operation and the second mode of operation by identifying the expiration of the timer 246 as a predefined condition. Other predefined conditions will be obvious to those of ordinary skill in the art having the benefit of this disclosure.

In one embodiment, the one or more processors 216 are operable to change a gain on the microphone 260 such that voice input from a user can be received from different distances. For example, in one embodiment the one or more processors 216 are operable to operate the microphone 260 in a first mode at a first gain sensitivity so that voice commands from a user can be received from more than one foot away from the device. If the electronic device 200 is a smartphone, for instance, the one or more processors 216 may operate the microphone 260 in a first mode at a first gain sensitivity to receive voice input from a user when operating in a speakerphone mode for example. Similarly, when the electronic device 200 is configured with a voice control interface engine 245, the one or more processors 216 may operate the microphone 260 in a first mode at a first gain sensitivity to receive voice input from a user several feet away. This would cause the microphone 260 to function as did the microphone of prior art electronic device (100) of FIG. 1 in which voice commands (102) could be received from several feet away.

In one embodiment, the one or more processors 216 may further operate the microphone 260 in a second mode at a second gain sensitivity to receive voice input from a user. In one embodiment, the second gain sensitivity is less than the first gain sensitivity. This results in voice input being received from closer distances at lower levels. If the electronic device 200 is a smartphone, for instance, the one or more processors 216 may operate the microphone 260 in a second mode at a second gain sensitivity to receive voice input from a user when the electronic device 200 is placed against the user's face. As the microphone 260 is very close to the user's mouth, this second, lesser gain sensitivity can be used to capture lower volume voice input from the user. Similarly, when the electronic device 200 is configured with a voice control interface engine 245, the one or more processors 216 may operate the microphone 260 in a second mode at a second gain sensitivity to receive voice input from a user's mouth that may be only an inch (or less) from the microphone 260. Not only can this assist in keeping third parties and eavesdroppers from hearing a conversation when operating in the discreet mode of operation, but it can be of assistance in noisy environments since the user is delivering voice commands from a close proximity to the microphone 260.

It is well to note, as a reminder, that as noted above relational terms such as first and second, top and bottom, and the like may be used solely to distinguish one entity or action from another entity or action without necessarily requiring or implying any actual such relationship or order between such entities or actions. Accordingly, the first mode can be considered to be the second mode in other contexts, and vice versa. This point is reiterated here for clarity, as the claims may refer to a first mode that is referred to as the second mode in the specification, and vice versa. The agnostic use of first and second to merely distinguish, without implying a relationship, is used for brevity as describing each in the alternative would easily double the length of the present specification. Those of ordinary skill in the art having the benefit of this disclosure will readily appreciate this fact.

In a similar fashion, the one or more processors 216 can operate one or both of the earpiece speaker 261 and/or the loudspeaker under speaker port 232 in either a first mode or a second mode. In one embodiment, the one or more processors 216 are operable to change a gain of either speaker such that audible output from the electronic device 200 can be heard by a user at different distances. For example, in one embodiment the one or more processors 216 are operable to operate one or both of the earpiece speaker 261 and/or the loudspeaker under speaker port 232 in a first mode at a first gain so that audible output is produced at a first output level. In one embodiment, the first output level is a volume sufficient that the audible output can be heard from more than one foot away from the device. If the electronic device 200 is a smartphone, for instance, the one or more processors 216 may operate one or both of the earpiece speaker 261 and/or the loudspeaker under speaker port 232 in a first mode at a first gain to produce output at a louder volume when operating in a speakerphone mode for example. Similarly, when the electronic device 200 is configured with a voice control interface engine 245, the one or more processors 216 may operate the one or both of the earpiece speaker 261 and/or the loudspeaker under speaker port 232 in a first mode at a first gain to produce audible output at a first output level so that a user can hear the audible output from a user several feet away. This would cause the one or both of the earpiece speaker 261 and/or the loudspeaker under speaker port 232 to function as did the loudspeaker of prior art electronic device (100) of FIG. 1 in which audible output (103) could be heard from several feet away.

In one embodiment, the one or more processors 216 may further operate the one or both of the earpiece speaker 261 and/or the loudspeaker under speaker port 232 in a second mode at a second gain to produce audible output at a second output level. In one embodiment, the second gain is less than the first gain such that the second output level is at a lower volume than the first output level. This results in audible output only being audible from closer distances due to the lower output levels. If the electronic device 200 is a smartphone, for instance, the one or more processors 216 may operate the one or both of the earpiece speaker 261 and/or the loudspeaker under speaker port 232 in a second mode at a second gain to deliver audible output to a user when the electronic device 200 is placed against the user's face. As the earpiece speaker 261 is very close to the user's ear, this second, lesser gain can be used to deliver audible output at a lower level so as not to overdrive the user's eardrums. Similarly, when the electronic device 200 is configured with a voice control interface engine 245, the one or more processors 216 may operate one or both of the earpiece speaker 261 and/or the loudspeaker under speaker port 232 in a second mode at a second gain to deliver audible output to a user's ear when the earpiece speaker 261 is only an inch (or less) from the earpiece speaker 261. In one embodiment, this second mode of operation, i.e., where the second output level is less than the first output level, is known as the "discreet mode" of operation.

In one embodiment, the one or more processors 216 are to switch between the earpiece speaker 261 and the loudspeaker under speaker port 232 when operating in the first mode and the second mode. For example, the earpiece speaker 261 may comprise a small driver to deliver audible output only a few millimeters. By contrast, the loudspeaker under speaker port 232 may be a large driver to deliver audible output across larger distances. Where this is the case, when operating in the first mode the one or more processors 216 may deliver all audio output from speaker port 232. When operating in the second mode, the one or more processors 216 may deliver all audible output from the earpiece speaker 261. Accordingly, in one or more embodiments the voice control interface engine 245 is operative in the second mode to output the audible output from a second loudspeaker, e.g., earpiece speaker 261, that is different from the loudspeaker operable in the first mode, e.g., speaker port 232.

In one embodiment, the output components 243 may include analog-to-digital converters (ADCs), digital-to-analog converters (DACs), echo cancellation, high-pass filters, low-pass filters, band-pass filters, adjustable band filters, noise reduction filtering, automatic gain control (AGC) and other audio processing that may be applied to filter noise from audio. For example, these devices may be used to filter noise received from the microphone 260. The output components 243 may be a single component as shown in FIG. 2 or may be implemented partly in hardware and partly in software or firmware executed by one or more processors 216. In some embodiments, the output components 243 may be implemented using several hardware components and may also utilize one or more software or firmware components in various combinations. The output components 243 may be operative to control one or both of the earpiece speaker 261 and/or the loudspeaker under speaker port 232, and/or to selectively turn these output devices ON or OFF. Additionally, the output components 243 can adjust filtering or gain of one or both of the earpiece speaker 261 and/or the loudspeaker under speaker port 232 for purposes of various applications described below.

In one or more embodiments, the electronic device 200 includes a voice control interface engine 245. The voice control interface engine 245 can include hardware, executable code, and speech monitor executable code in one embodiment. The voice control interface engine 245 can include, stored in memory 218, basic speech models, trained speech models, or other modules that are used by the voice control interface engine 245 to receive and identify voice commands. In one embodiment, the voice control interface engine 245 can include a voice recognition engine. Regardless of the specific implementation utilized in the various embodiments, the voice control interface engine 245 can access various speech models to identify speech commands.

In one embodiment, the voice control interface engine 245 is configured to implement a voice control feature that allows a user to speak a specific trigger phrase, followed by a command, to cause the one or more processors 216 to execute an operation. For example, the user may say, as a trigger phase, "Okay, Phone, Ready, now Go!" After this, the user may speak a command, such as "How tall is the Sears Tower?" This combination of trigger phrase and command can cause the one or more processors 216 to access an application module 247, such as a web browser, to search for the answer and then deliver the answer as audible output via an output component 243. For example, when operating in the first mode, the one or more processors 216 may deliver the answer as audible output through speaker port 232 at a first output level. When operating in the discreet mode, the one or more processors 216 may deliver the answer as audible output through the earpiece speaker 261 at a second, softer output level. In short, in one embodiment the voice control interface engine 245 listens for voice commands, processes the commands and, in conjunction with the one or more processors 216, returns an audible output that is the result of the user's intent.

In one or more embodiments, the one or more processors 216 are operable to transition the voice control interface engine 245 between the first mode and the second mode, or discreet mode, in response to detecting a predefined user input. In one embodiment, the predefined user input is a gesture input determined by the proximity sensors 208. In another embodiment, the predefined user input is movement of the electronic device 200 as detected by the motion detectors 242 or other sensors 209. In another embodiment, the predefined user input comprises a trigger phrase or unique voice command that causes the transition. In another embodiment, the predefined user input is placing the display 202 of the electronic device 200 against the user's face as determined by the proximity sensors 208. In another embodiment, the predefined user input comprises the proximity sensors 208 being in a covered or uncovered state, which indicates whether the user is holding the electronic device 200 against, for example, their face. In yet another embodiment, the predefined user input is actuation of a user actuation target 204,205,206,207 by a finger or stylus. Many of these examples will be explained in more detail with reference to FIGS. 4-12 below. Still others will be obvious to those of ordinary skill in the art having the benefit of this disclosure.

In one or more embodiments, the voice control interface engine 245 is operative in a first mode to receive a speech command through the microphone 260 from a first distance and, in response to the speech command, produce an audible output at a first output level. In one embodiment, this audible output is delivered to a user through speaker port 232.

The one or more processors 216 are then operable to detect a predefined user input. In one embodiment, the predefined user input comprises a predefined motion of the electronic device 200 by using the motion detectors 242 to determine the spatial orientation of the electronic device 200 in three-dimensional space by detecting a gravitational direction. Similarly, the motion detectors 242 or other sensors 209 can include one or more gyroscopes to detect rotational motion of the electronic device. The gyroscope can be used to determine the spatial rotation of the electronic device in three-dimensional space. Each of these can be used to detect gesture input.

In one or more embodiments the one or more processors 216 are configured to detect not only gesture input, but also a predetermined characteristic of a gesture input. Examples of such characteristics include gesture duration, gesture intensity, gesture proximity, gesture accuracy, gesture contact force, or combinations thereof. Where the one or more processors 216 detect such a predetermined characteristic, it can be used to control the voice control interface engine 245, and to toggle it between a first mode of operation and a second mode of operation.

When detection of the predefined user input occurs, in one embodiment the one or more processors 216 are operable to transition the voice control interface engine 245 to a second mode of operation, which is the discreet mode in one embodiment. When operating in the discreet mode, the voice control interface engine 245 is operable to receive speech commands from a second distance that is less than the first distance associated with the first mode. Further, the voice control interface engine 245 can be operable to produce, in response to the received speech commands, an audible output at a second output level that is less than the first output level. In one embodiment, these softer output commands are delivered to a user through the earpiece speaker 261.

Advantageously, by delivering the predefined user input to cause the voice control interface engine 245 to transition from the first mode to the discreet mode, the user can take advantage of voice controlled operation without third parties or eavesdroppers hearing the information delivered in the form of audible output. This solves the unforeseen problem illustrated in FIG. 1 where onlookers could overhear the audible response. Thus, if a user plans to listen to a voice mail that may be of a sensitive nature, the user simply delivers the predefined user input to the electronic device 200 to cause the one or more processors 216 to transition the voice control interface engine 245 to the discreet mode of operation, as is illustrated in FIGS. 4-7 below. As noted, the predefined user input can be any of a gesture input, a touch input, voice input, proximity sensor input, a predefined movement of the electronic device 200, or other predefined gesture. Additionally, in one or more embodiments the user can use other predefined user inputs to transition back to the first mode of operation as desired. This transition back will be illustrated below in FIGS. 8-12.

It is to be understood that the electronic device 200 and the architecture of FIG. 2 is provided for illustrative purposes only and for illustrating components of one electronic device 200 in accordance with embodiments of the disclosure, and is not intended to be a complete schematic diagram of the various components required for an electronic device. Therefore, other electronic devices in accordance with embodiments of the disclosure may include various other components not shown in FIG. 2, or may include a combination of two or more components or a division of a particular component into two or more separate components, and still be within the scope of the present disclosure.

Figure 3:
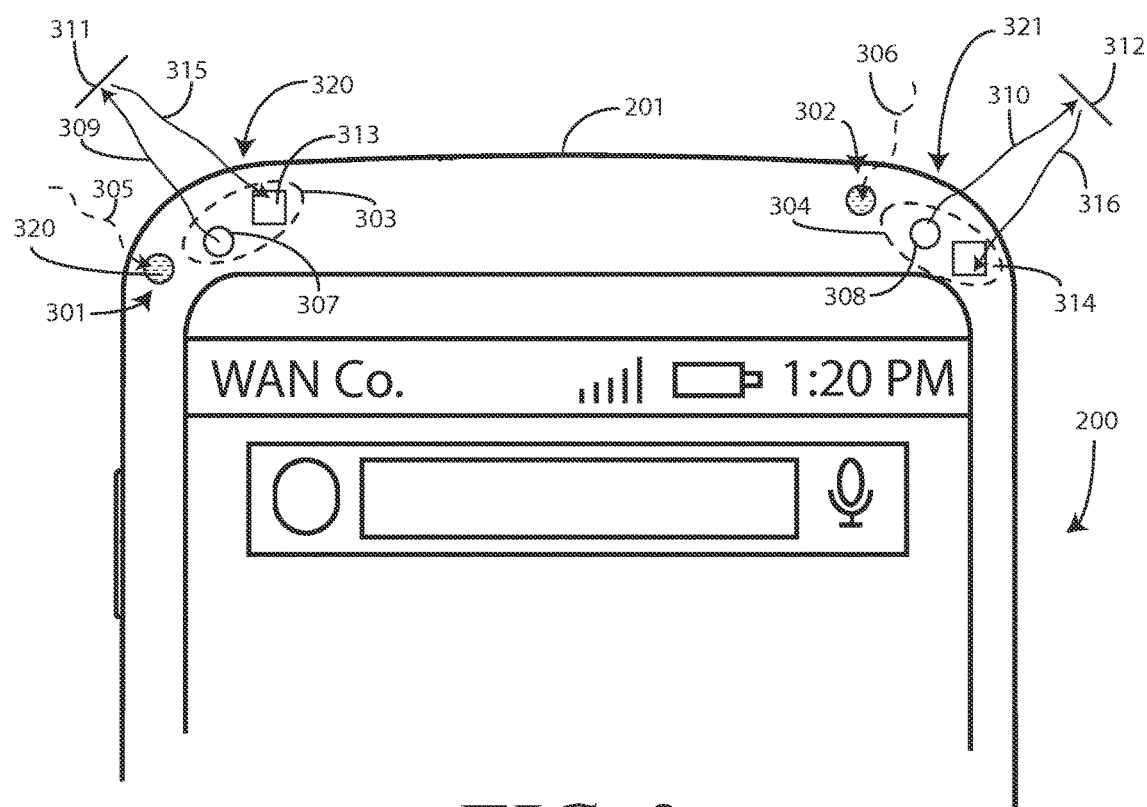
FIG. 3 illustrates explanatory proximity sensors in accordance with one or more embodiments of the disclosure.

Turning now to FIG. 3, illustrated therein is the difference between proximity sensor components 301,302 and proximity detector components 303,304 as those terms are used herein. Illustrated therein are two proximity sensor components 301,302 and two proximity detector components 303, 304, each disposed at different locations 320,321, each of which happens to be a corner of the electronic device 200 in this illustrative embodiment. In this embodiment, each proximity sensor component 301,302 comprises a signal receiver 313 only, such as an infrared photodiode to detect an infrared emission 305,306 from an object external to the housing 201 of the electronic device 200. No corresponding transmitter is included or required for the proximity sensor component 301,302 to function. As no active transmitter emitting signals is included, each proximity sensor component 301,302 is sometimes referred to as a "passive IR" proximity sensor. As the proximity sensor components 301, 302 receive thermal emissions from an object, in one or more embodiments they can be used as temperature sensors.

By contrast, each proximity detector component 303,304 can be an infrared proximity sensor set that uses a signal emitter 307,308 that transmits a beam 309,310 of infrared light that reflects 311,312 from a nearby object and is received by a corresponding signal receiver 313,314. Proximity detector components 303,304 can be used, for example, to compute the distance to any nearby object from characteristics associated with the reflected signals 315,316. The reflected signals 315,316 are detected by the corresponding signal receiver 313,314, which may be an infrared photodiode used to detect reflected light emitting diode (LED) light, respond to modulated infrared signals, and/or perform triangulation of received infrared signals. Accordingly, the proximity detector components 303,304 can be used to determine of the electronic device 200 is covered by clothing in one or more embodiments.

In one embodiment, the proximity sensor components 301,302 and the proximity detector components 303,304 can include at least two sets of components. For example, a first set of components can be disposed at a location 320 on the electronic device 200, while another set of components can be disposed at a second location 321 on the electronic device 200.

Figure 4:
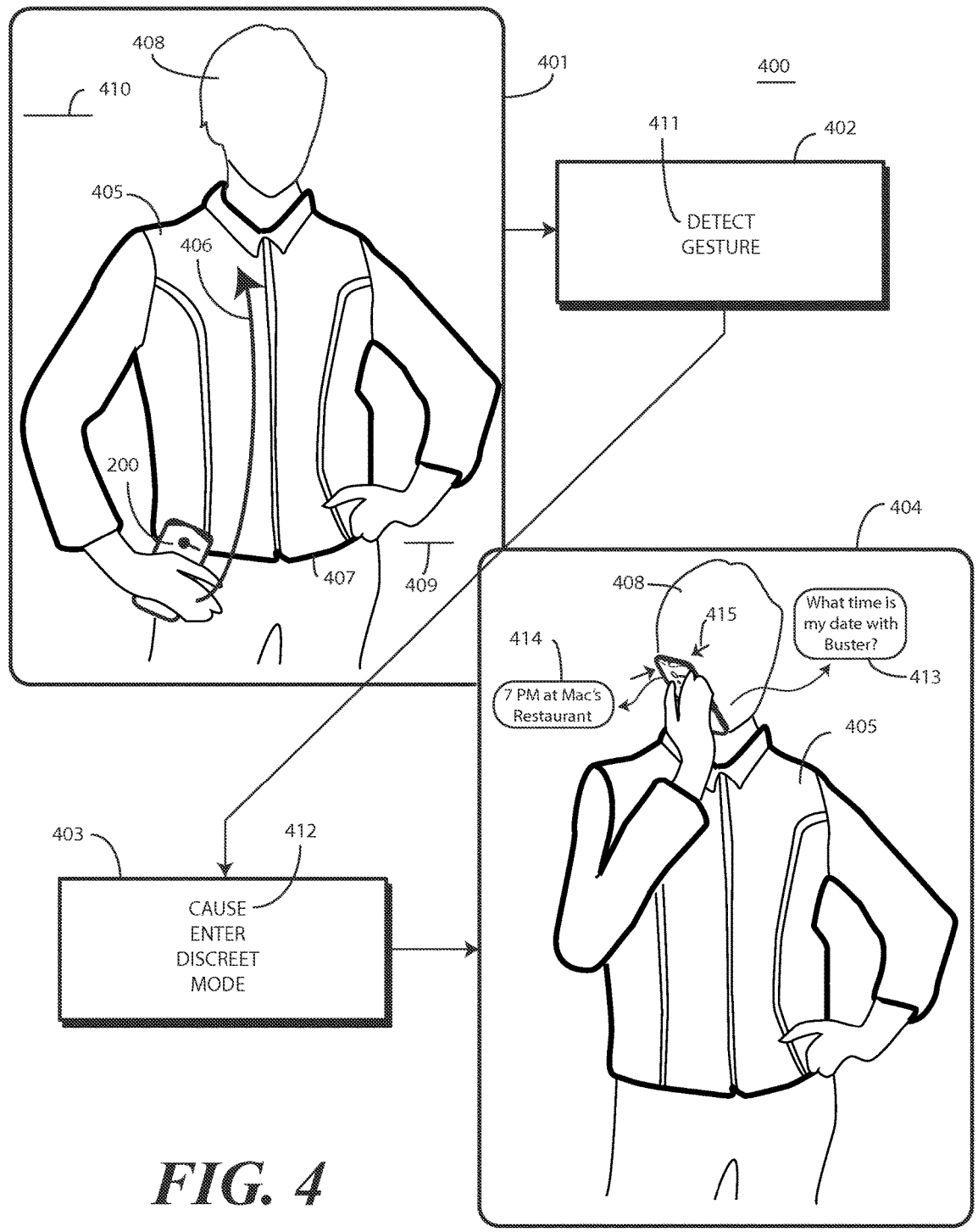
FIG. 4 illustrates one explanatory method in accordance with one or more embodiments of the disclosure.

Turning now to FIG. 4, illustrated therein is a method 400 of using an electronic device 200 in accordance with one or more embodiments of the disclosure. At step 401, a user 405 is shown holding the electronic device 200. At step 401, the electronic device 200 is operating in a default mode of operation, which is the first mode of operation where the voice control interface engine (245) is operative to receive a speech command from a first distance and produce, in response to the speech command, an audible output at a first output level. Thus, the electronic device 200 would function exactly as the prior art electronic device (100) of FIG. 1 when operating in the first mode. The user 405 could deliver, in a normal conversational tone, a voice command asking, "How tall is the Sears Tower?" and the electronic device 200 would announce the answer with an audible output that the user 405 could hear several feet away.

However, in FIG. 4, the user 405 is interested in receiving personal information that she does not want third parties to hear. Accordingly, at step 401 the user delivers a predefined user input 406 by raising the electronic device 200 from her waist 407 to her head 408. Accordingly, the predefined user input 406 of this explanatory step 401 comprises lifting the electronic device 200 from a first elevation 409 to a second elevation 410, where the second elevation 410 is greater than the first elevation 409.

At step 402, the one or more processors (216) of the electronic device detect 411 the predefined user input 406. At step 403, the one or more processors (216) cause 412 the voice control interface engine (245) to transition to a second mode. As shown at step 404, in the second mode the voice control interface engine (245) is operative to receive the speech command 413 from a second distance and produce, in response to the speech command, the audible output 414 at a second output level. Here, the user 405 is asking, "What time is my date with Buster?" The audible output 414, which no eavesdroppers can hear due to its lower volume, says, "Seven PM at Mac's Restaurant."

In one embodiment, the second distance is less than the first distance of the first mode. Further, the second output level is less than the first output level. This is illustrated in the drawings by comparing FIG. 1 and FIG. 4. In FIG. 1, the user 101 is a first distance 104 from the prior art electronic device 100. In FIG. 4, the user 405 is a second distance 415 from the electronic device 200 that is less than the first distance (104). The second output level is indicated by the smaller text of the audible output 414 of FIG. 4 compared with the large text of the audible output (103) of FIG. 1.

In another embodiment, the predefined user input 406 is not movement of the electronic device 200 from one elevation 409 to another elevation 410. Instead, in another embodiment the predefined user input 406 is detected by the proximity sensors (208) that are operable with the one or more processors (216). For example, in another embodiment at step 404, the proximity sensors (208) can detect that the electronic device is proximately located with the user's head

408. When this occurs, the one or more processors (216) can cause the voice control interface engine (245) to transition to a second mode operative to receive speech commands 413 from a second distance 415 and produce, in response to the speech command 413, the audible output at a second output level as previously described. Of course, combinations of user inputs can be used as well. For instance, in another embodiment the predefined user input 406 can be a combination of detecting a predefined gesture and, with the proximity sensors (208) detecting that the electronic device is proximately located with the user's head 408. Other predefined user input 406 will be obvious to those of ordinary skill in the art having the benefit of this disclosure.

Figure 5:
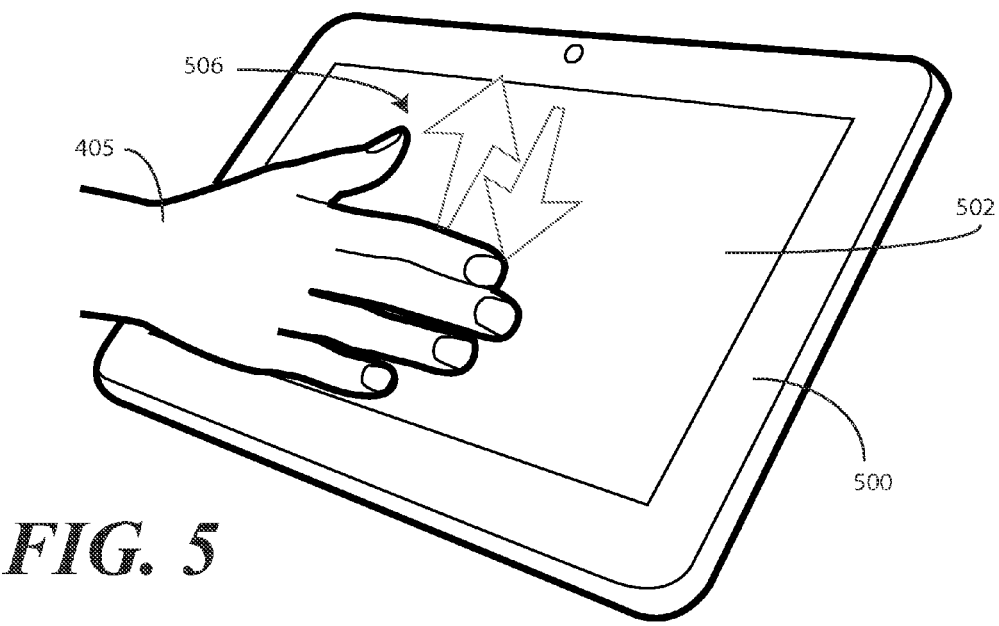
FIG. 5 illustrates alternate method steps suitable for use with explanatory methods in accordance with one or more embodiments of the disclosure.

Turning now to FIG. 5, illustrated therein is another predefined user input 506. In this embodiment, the predefined user input 506 comprises an open-air gesture that can be used to cause the voice control interface engine (245) to transition to a second mode operative to receive speech commands from a second distance and produce, in response to the speech command, the audible output at a second output level as previously described.

In some embodiments, the proximity sensors (208) and/or other sensors (209) can be configured to detect such predefined gesture input. For example, in one embodiment the proximity sensors (208) can comprise an infrared detector. Open-air gesture input may be detected from reflections of infrared signals from a user while the user is making gestures in close proximity to the proximity sensors (208). In another embodiment, the proximity sensors (208) comprise an imaging device such as a camera. In such an embodiment, open-air gesture input may be detected by capturing successive images of a user making a gesture in close proximity to the imaging device. In yet another embodiment, open-air gesture input is detected by light. The proximity sensors (208) can include a light sensor configured to detect changes in optical intensity, color, light, or shadow in the near vicinity of the electronic device 200. The light sensor can compare successive readings of luminous intensity, color, or other spatial variations between images to detect motion or the presence of an object near the electronic device 200. In still another embodiment, the proximity sensors (208) can include one or more devices to emit an electromagnetic or electrostatic field. A receiver then receives reflections of the field from the nearby object. The proximity sensors (208) detect changes in the received field to detect positional changes of nearby objects based upon changes to the electromagnetic or electrostatic field resulting from the object becoming proximately located with a sensor.

In FIG. 5, the user 405 is waving a hand a few inches above the display 502 of an electronic device 500 to create the open-air gesture. A user interface includes a gesture detector and is capable of detecting open-air gestures within about five inches of the electronic device 500. Accordingly, by waving the hand back and forth, the user 405 is able to cause the voice control interface engine (245) to transition to a second mode operative to receive speech commands from a second distance and produce, in response to the speech command (413), the audible output at a second output level.

It should be noted that the open-air gesture can occur in two dimensions about the electronic device 500 in one embodiment. In another embodiment, the movements of the open-air gesture can occur in three dimensions about the electronic device 500. Where the predefined gesture comprises a three-dimensional input occurring about the electronic device 500, a wider number of gestures become available as the predefined user input. Illustrating by way of a simple example, a three-dimensional input could include the waving, i.e., the movements of the open-air gesture, followed by an upward rise to provide motion in a third dimension. Other predefined motions will be obvious to those of ordinary skill in the art having the benefit of this disclosure.

Figure 6:
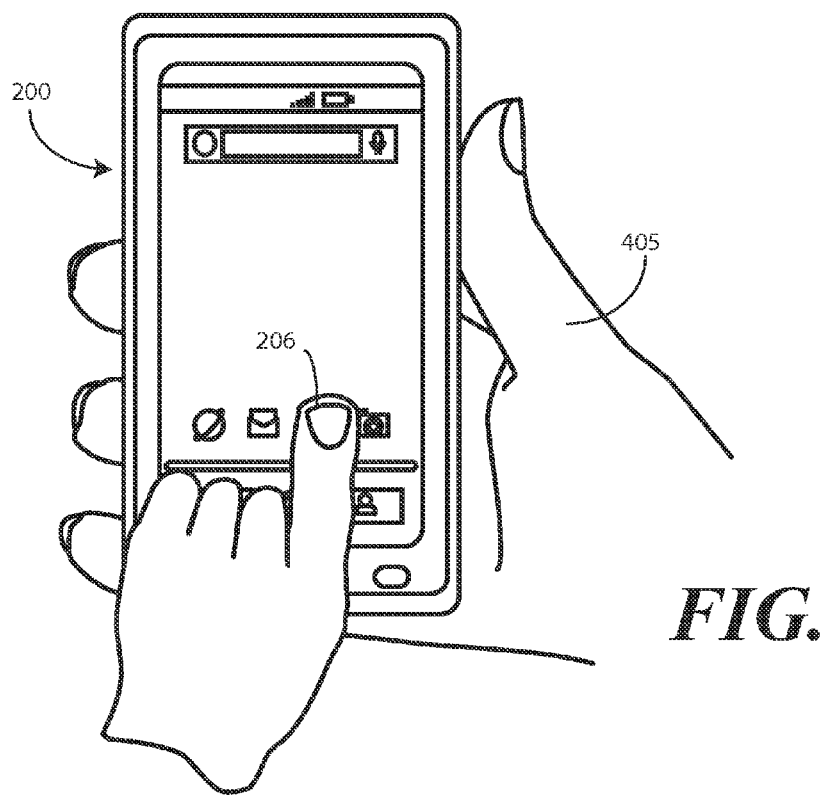
FIG. 6 illustrates alternate method steps suitable for use with explanatory methods in accordance with one or more embodiments of the disclosure.

Turning to FIG. 6, in this embodiment the user 405 is delivering the predefined user input by touching a user actuation target 206. This provides a more direct method of delivering a predefined user input to the electronic device 200 cause to the voice control interface engine (245) to transition to a second mode operative to receive the speech command from a second distance and produce, in response to the speech command, the audible output at a second output level.

Figure 7:
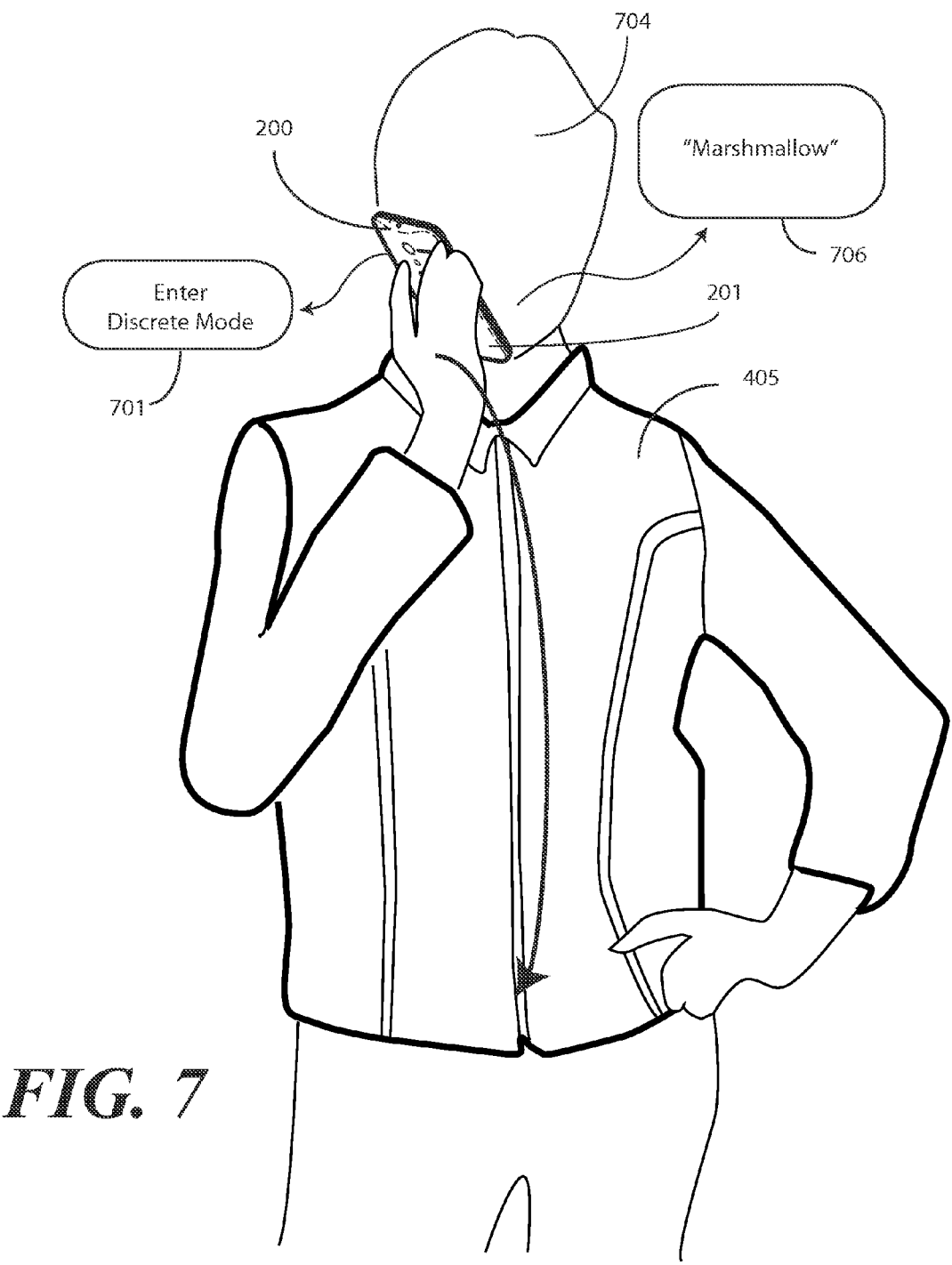
FIG. 7 illustrates alternate method steps in accordance with one or more embodiments of the disclosure.

Turning now to FIG. 7, illustrated therein is another predefined user input 706. In this embodiment, the predefined user input 706 comprises a trigger phrase or voice command that is specific and that can be used to cause the voice control interface engine (245) to transition 701 to a second mode operative to receive speech commands from a second distance and produce, in response to the speech command, the audible output at a second output level as previously described. Here, the user 405 says a unique trigger word, "marshmallow," which would not typically come up in conversation. The one or more processors (216) of the electronic device 200 recognize this trigger word and, in response, transition 701 to a second mode of operation.

Other examples of predefined user input will be obvious to those of ordinary skill in the art having the benefit of this disclosure. Illustrating by example, in another embodiment the one or more processors (216) of the electronic device 200 can monitor the proximity sensors (208) to determine whether an object, such as the user's head 704, is proximately located with the housing 201 of the electronic device 200. Embodiments of the disclosure contemplate that when the user 405 is holding the electronic device 200 against their head 704, it is likely that they prefer the electronic device 200 to operate in the discreet mode of operation. Accordingly, in one embodiment, the predefined user input would comprise the proximity sensors (208) detecting that an object is proximately located with the housing 201 of the electronic device 200. When this occurs, the one or more processors (216) of the electronic device 200 recognize this and, in response, transition 701 to a second mode of operation in one or more embodiments.

Illustrating with another example, in the prior art example of FIG. 1, had the prior art electronic device 100 been an electronic device (200) configured in accordance with embodiments of the disclosure, another example of a predefined user input would be moving the electronic device (200) from a first position distally located from the user 101, such as on the table 105, to a second position proximately located with a user 101, such as near the user's head 106 or face 107. In any of the above examples, the one or more processors (216), operable with the proximity sensors (208) and/or other sensors (209), are operable to identify the predefined gesture input and to cause the voice control interface engine (245) to transition to a second mode operative to receive the speech command from a second distance and produce, in response to the speech command, the audible output at a second output level.

Figure 8:
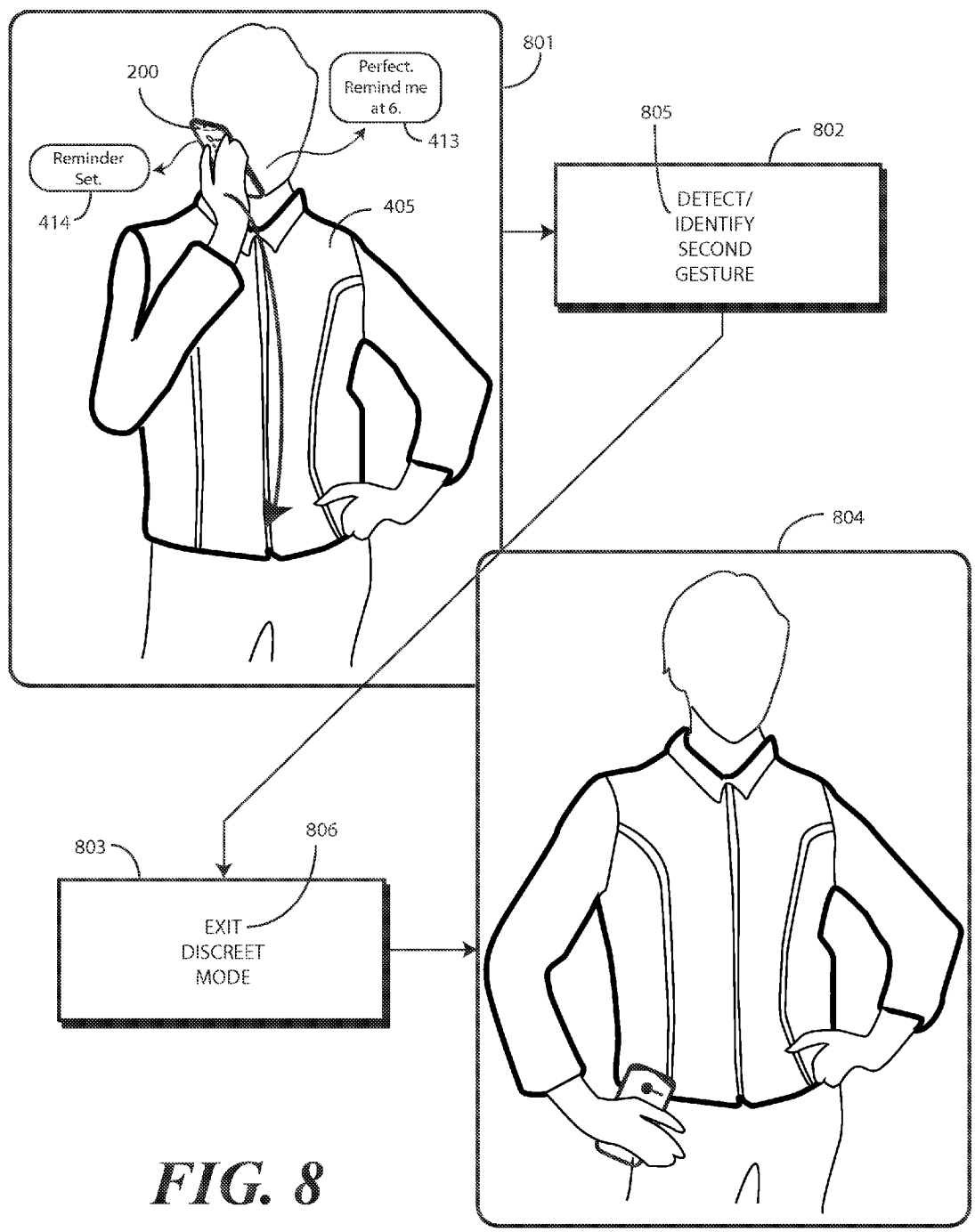
FIG. 8 illustrates another explanatory method in accordance with one or more embodiments of the disclosure.

Embodiments of the disclosure contemplate that once the voice control interface engine (245) is in the second mode, it can be desirable to transition the electronic device (200) back into the first mode of operation so that it can be used as shown in FIG. 1. There are a variety of ways to accomplish this. Turning now to FIG. 8, illustrated therein is one such embodiment.

At step 801, the electronic device 200 is operating in the second mode, where speech commands 413 are received at a softer volume and audible responses are delivered at the second, softer output level. In this example, the user 405 is continuing the conversation from step (404) of FIG. 4, as the voice command is to remind the user of the date with Buster at 6 PM. The audible output 414 generated says, "Reminder set."

The user 405 is now done with the discreet mode of operation. Accordingly, in one embodiment, the user 405 can return the voice control interface engine (245) to the first mode of operation when a predefined condition is identified. In FIG. 8, the predefined condition is a reverse motion 805 of the electronic device 200, which is identified 808 by one or both of the proximity sensors (208) and/or other sensors (209) at step 802. When this occurs, in one embodiment at step 803 the one or more processors (216) are operable to return 806 the voice control interface engine (245) to the first mode of operation.

Figure 9:
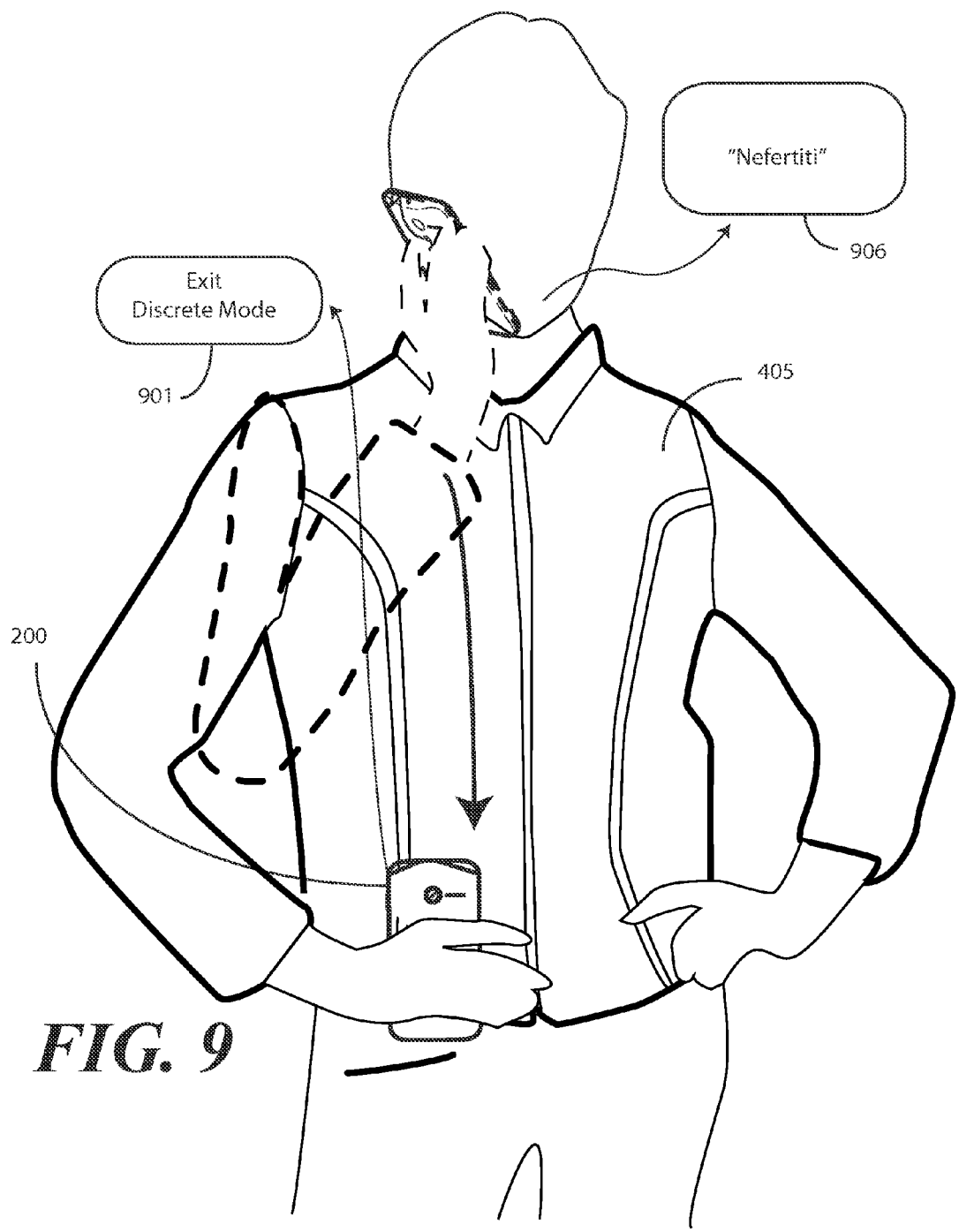
FIG. 9 illustrates alternate method steps suitable for use with explanatory methods in accordance with one or more embodiments of the disclosure.

As with the predefined user input to cause the voice control interface engine (245) to enter the second mode, the predefined condition can be any of a number of conditions. For example, in another embodiment, the predefined condition can be another trigger word or voice command Turning now to FIG. 9, illustrated therein is another predefined user input 906 that can be used to cause the one or more processors (216) to return 806 the voice control interface engine (245) to the first mode of operation.

In this embodiment, as was the case in FIG. 7 above, the predefined user input 906 comprises a trigger phrase or voice command that is specific and that can be used to cause the voice control interface engine (245) to return 806 to the first mode operative to receive speech commands from a first distance and produce, in response to the speech command, the audible output at a first output level as previously described. Here, the user 405 says another unique trigger word, "Nefertiti," which would also not typically come up in conversation. The one or more processors (216) of the electronic device 200 recognize this trigger word and, in response, return 806 to the first mode of operation.

Figure 10:
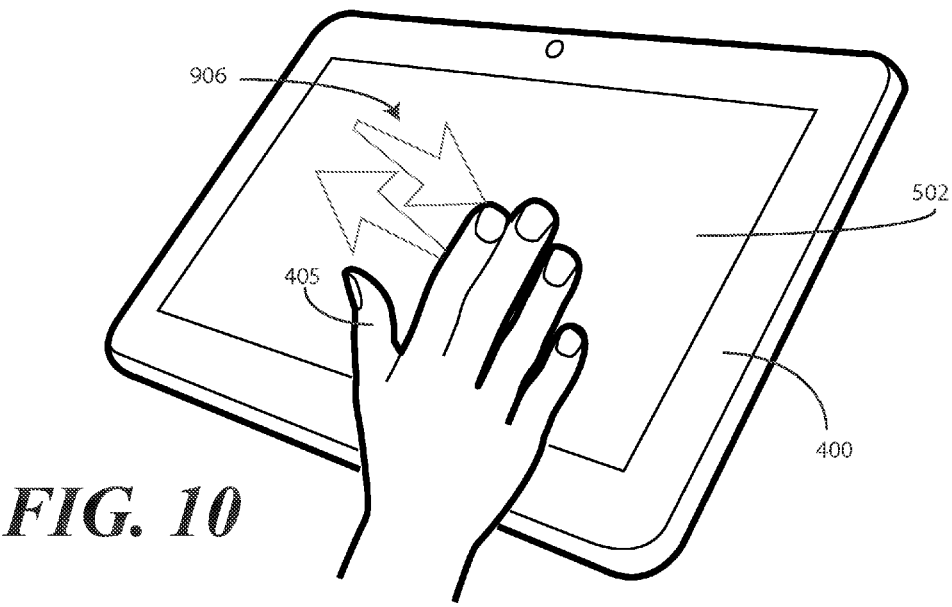
FIG. 10 illustrates alternate method steps suitable for use with explanatory methods in accordance with one or more embodiments of the disclosure.

In another embodiment, the predefined condition can be a gesture input such as that shown in FIG. 4. Turning to FIG. 10, illustrated therein is another predefined user input 906 that can be used to cause the one or more processors (216) to return the voice control interface engine (245) to the first mode of operation.

In this embodiment, the predefined user input 906 comprises another open-air gesture that can be used to cause the voice control interface engine (245) to return to the first mode operative to receive speech commands from a first distance and produce, in response to the speech command, the audible output at a first output level as previously described. While the predefined user input (506) of FIG. 5 was a vertically oriented gesture, the predefined user input 906 of FIG. 9 is horizontally oriented. Accordingly, the user 405 can gesture "north and south" to cause the voice control interface engine (245) to enter the second mode of operation, while gesturing "east and west" to cause the voice control interface engine (245) to return to the first mode of operation. As with FIG. 5, in FIG. 9 the user 405 is waving a hand a few inches above the display 502 of an electronic device 500 to create the open-air gesture.

Figure 11:
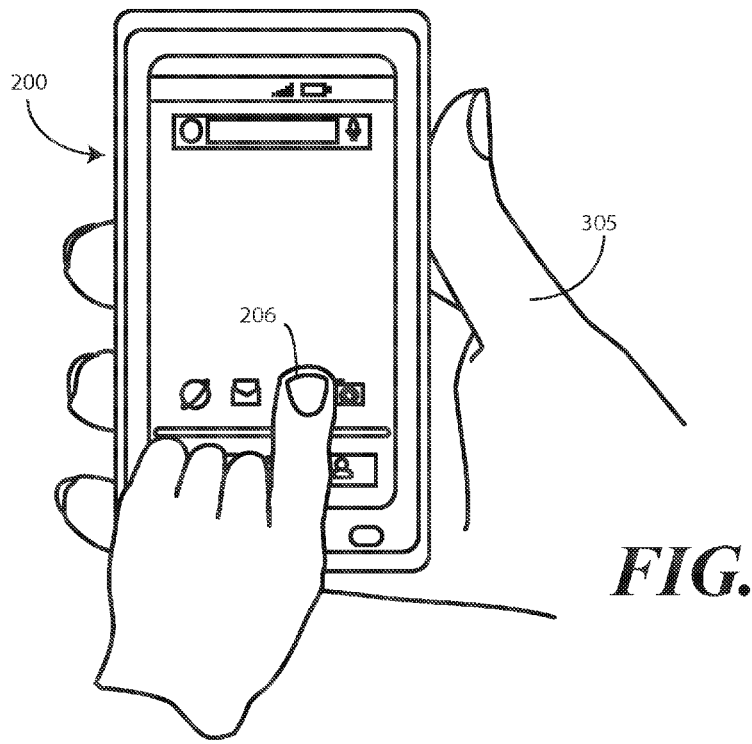
FIG. 11 illustrates alternate method steps in accordance with one or more embodiments of the disclosure.

Turning to FIG. 11, in this embodiment the user 405 is delivering the predefined user input by again touching a user actuation target 206. This provides a more direct method of delivering a predefined user input to the electronic device 200 cause to the voice control interface engine (245) to return to the first mode of operation when operating in the second mode of operation.

In still another embodiment, the electronic device 200 includes a timer (246). Once user interaction is complete, e.g., when the user 405 is done delivering the speech command 413 at step 601, the one or more processors (216) can start the timer (246). When the timer (246) expires, the one or more processors (216) can return the voice control interface engine (245) to the first mode of operation by identifying the expiration of the timer (246) as the predefined condition. Other predefined conditions will be obvious to those of ordinary skill in the art having the benefit of this disclosure.

Embodiments of the disclosure contemplate that in some cases the user 405 will not make any affirmative action, e.g., gesture, touch, voice command, and so forth, to cause the voice control interface engine (245) to return to the first mode of operation. Moreover, in some cases it can be difficult to determine when the user 405 has finished their interaction with a certain application. For example, a manufacturer of the electronic device 200 may not be the manufacturer of all the applications that are operable on the electronic device 200. Accordingly, the operating system environment may not be able to predict when a particular application completes an operational cycle.

Consider the case where the user 405 is interacting with a search engine application as was the case in FIG. 1. Where the user 405 asks, "How tall is the Sears Tower?," the search engine application may search various sources and then reply with the answer, "Fourteen hundred and fifty one feet." The operating system environment may have no way of knowing whether the word "feet" is the final answer. The search engine application may be about to reply "and two inches," or may be finished. Given the uncertainty that can arise in situations such as this, embodiments of the present disclosure provide even further methods of causing the voice control interface engine (245) to transition between the first mode and the second mode of operation.

In one or more embodiments, these additional methods involve the use of the proximity sensors (208) and the timer (246) to provide a quick and automatic method for causing the voice control interface engine (245) to transition between the first mode and the second mode of operation. In one or more embodiments, if the proximity sensors (208) indicate that no object is proximately located with the housing 201 of the electronic device 200 for more than a predetermined time measured by the timer (246), such as three seconds or five seconds, the one or more processors (216) will cause the voice control interface engine (245) to switch back to the first mode of operation. However, if an object is detected by the proximity sensors (208), the one or more processors (216) will cause the voice control interface engine (245) to remain in the second mode of operation, i.e., the discreet mode.

In one or more embodiments, when the electronic device 200 is operating in the discreet mode, the proximity sensors (208) then monitor the proximity sensors (208) to detect an object, such as the user's head (704) is proximately located with the housing (201) of the electronic device 200. In one or more embodiments, the one or more processors (216) then detect, from the one or more proximity sensors (208), removal of the object from the housing (201) of the electronic device 200. When this occurs, i.e., upon detecting removal of the object, in one embodiment the one or more processors (216) then initiate the timer (246). Upon expiration of the timer (246), the one or more processors (216) can cause the voice control interface engine (245) to transition back to the first mode operative to receive the speech command from a first distance and produce, in response to the speech command, the audible output at a first output level where the first distance is greater than the first distance and the second output level is greater than the first output level.

Figure 12:
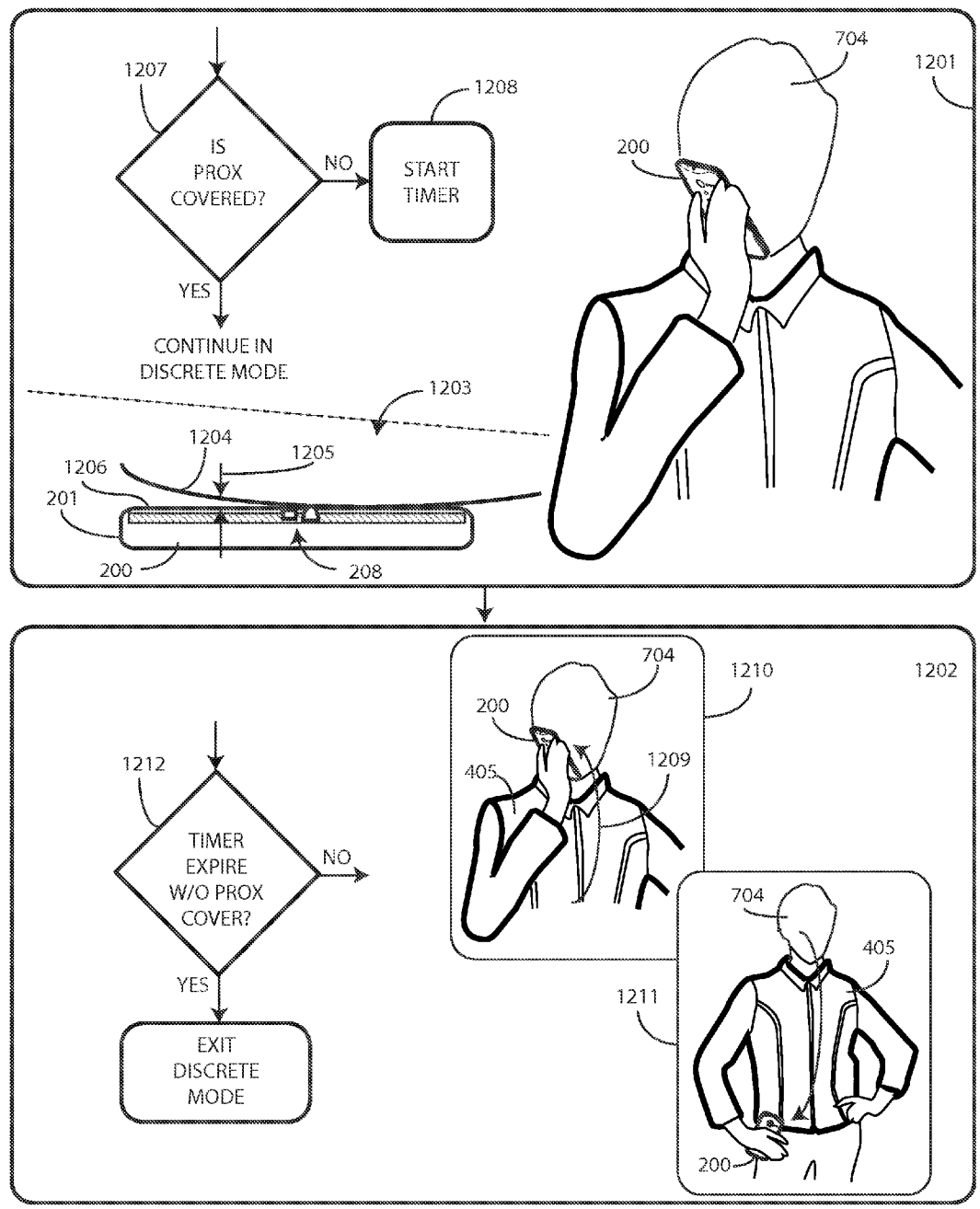
FIG. 12 illustrates another explanatory method in accordance with one or more embodiments of the disclosure.

Turning now to FIG. 12, illustrated therein is a method for causing the voice control interface engine (245) of an electronic device 200 to transition back to the first mode of operation in accordance with one or more embodiments of the disclosure. At step 1201, one or more processors (216) of the electronic device 200 are operating the voice control interface engine (245) in the second mode operative to receive a speech command from the second distance and produce, in response to the speech command, an audible output at the second output level. As shown at decision 1101, while operating in this mode, the one or more processors (216) monitor the proximity sensors 208 to determine whether an object, such as the user's head 704, is proximately located with the housing 201 of the electronic device 200.

As shown in partial view 1203, the one or more processors (216) can determine whether an object 1204, such as the user's head 704, is proximately located with a housing 201 of the electronic device 200 by determining if the object 1204 is covering the proximity sensor 208. Note that the proximity sensor 208 comprises a proximity sensor component (240) in one embodiment. In another embodiment, the proximity sensor 208 comprises a proximity detector component (241). In yet another embodiment, the proximity sensor 208 comprises a combination of proximity sensor components (240) and proximity detector components (241).

In one or more embodiments, the proximity sensor covered condition can be made when the proximity sensors 208 receive thermal emissions from the object 1204, as would be the case when the proximity sensors 208 comprise proximity sensor components (240), one or more reflected signals, as would be the case when the proximity sensors 208 comprise proximity detector components (241), or combinations thereof. In any one of these configurations, the proximity sensors 208 indicate that the object 2014 is less than a predefined distance 1205 from, i.e., is within a thermal radius of, a surface 1206 of the electronic device 200. This indicates that at least one of the proximity sensors 208 is covered by the object 1204.

As shown at decision 1207, the one or more processors (216) can then detect, from the one or more proximity sensors 208, removal of the object 1204 from the housing 201 of the electronic device 200. For example, when the user makes the reverse motion (805) shown at step (801) of FIG. 8, the one or more processors (216) would detect from the one or more proximity sensors 208 removal of the object 1204 from the housing 201 of the electronic device 200. In one embodiment, as shown at step 1208, upon detecting removal of the object 1204, the one or more processors (216) initiate the timer (246).

In one embodiment, the initiating occurring at step 1208 comprises setting the timer (246) to a predefined timer duration. After the predefined timer duration, the timer (246) will expire. Illustrating by example, in one embodiment the initiating occurring at step 1208 comprises setting the timer (246) to five seconds or less. In another embodiment, the initiating occurring at step 1208 comprises setting the timer (246) to three seconds or less. These timer durations are explanatory only, as others will be readily apparent to those of ordinary skill in the art having the benefit of this disclosure.

As shown at step 1202, after initiating the timer at step 1208, one of two conditions can occur: First, the proximity sensors 208 can be covered again, as when the user 405 returns 1209 the electronic device 200 to their head 704 as shown at step 1210. Alternatively, the proximity sensors 208 may remain uncovered, such as when the user 405 keeps the electronic device 200 away from their head 704 for the timer duration as shown at step 1211, and as determined at decision 1212. In one or more embodiments, upon expiration of the timer (246), when the proximity sensors 208 have remained uncovered during the timer duration, the one or more processors (216) can cause the voice control interface engine (245) to transition back to the first mode operative to receive the speech command from the first distance and produce, in response to the speech command, the audible output at the first output level, where the first distance is greater than the second distance and the first output level is greater than the second output level. However, where the object 1204 or another object becomes proximately located with the housing 201 of the electronic device 200 prior to expiration of the timer (246), as shown at step 1210, in one embodiment the one or more processors (216) can continue operating the voice control interface engine in the second mode, which is the discreet mode.

To illustrate this method in practice, consider the example from above where a user is interacting with a search engine application and asks, "How tall is the Sears Tower?" In one embodiment, the search engine application may search various sources and then reply with the answer, "Fourteen hundred and fifty one feet." If the timer expires while the search engine application is between the words "and" and "fifty," the one or more processors (216) can cause the voice control interface engine (245) to transition back to the first mode. This would result in the words "Fourteen hundred and" being delivered as audible output at the second, lower level, while the words "fifty one feet" are delivered as audible output at the first, higher level. The words "Fourteen hundred and" might be delivered from a earpiece speaker at a low volume, while the words "fifty one feet" are delivered from a speakerphone loudspeaker. This is but one example of operation. Others will be obvious to those of ordinary skill in the art having the benefit of this disclosure.

Figure 13:
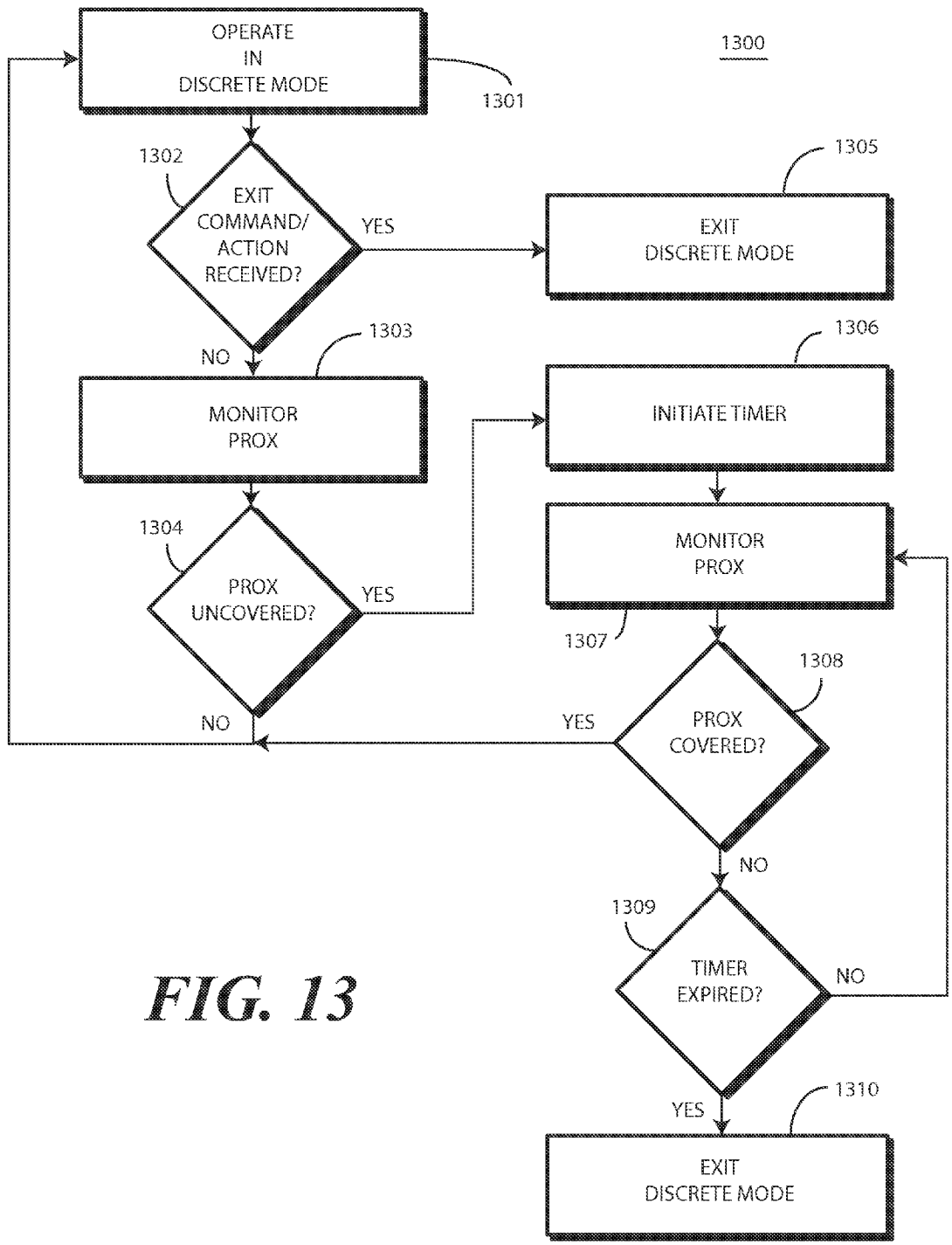
FIG. 13 illustrates another explanatory method in accordance with one or more embodiments of the disclosure.

This method is shown generally in flow-chart form in FIG. 13. Turning there now, illustrated therein is one explanatory method 1300 for controlling an electronic device in accordance with one or more embodiments of the disclosure.

Beginning at step 1301, the method 1300 operates a voice control interface engine of an electronic device in a first mode operative to receive a speech command from a first distance and produce, in response to the speech command, an audible output at a first output level. At step 1303, the method 1300 monitors, with one or more processors of the electronic device, one or more proximity sensors to detect an object proximately located with a housing of the electronic device while operating the voice control interface engine in the first mode.

At decision 1304, the method 1300 detects, by the one or more processors from the one or more proximity sensors, removal of the object from the housing of the electronic device. In one embodiment, as shown at step 1306, and upon detecting removal of the object, the method 1300 initiates a timer with the one or more processors.

At decision 1309, the method 1300 determines whether the timer has expired. In one embodiment, as shown at step 1310, and upon expiration of the timer, the method 1300 causes, with the one or more processors, the voice control interface engine to transition to a second mode operative to receive the speech command from a second distance and produce, in response to the speech command, the audible output at a second output level. In one embodiment, the second distance is greater than the first distance and the second output level greater than the first output level.

Note that some user activities can interrupt this transition from the first mode to the second mode. For example, as shown at decision 1308, in one embodiment the method 1300 detects, by the one or more processors from the one or more proximity sensors, the object or another object becoming proximately located with the housing of the electronic device prior to expiration of the timer. In one embodiment, when this occurs, the method 1300 continues operating the voice control interface engine in the first mode as shown at step 1301.

Similarly, as shown at decision 1302, in one embodiment the method 1300 can receive, from a user interface, a predefined user input prior to expiration of the timer. As noted above, the user input can take any of a variety of forms. Examples noted above include predefined gesture input, predefined touch input, predefined movement of the electronic device, or predefined trigger words or voice commands. Still other examples of predefined user input will be obvious to those of ordinary skill in the art having the benefit of this disclosure. As shown at step 1305, where this predefined user input is received prior to expiration of the timer, in one embodiment the method causes, with the one or more processors, the voice control interface engine to transition to the second mode in response to the receiving the predefined user input.

As shown and described above, an apparatus includes a voice control interface engine operative in a first mode to receive a speech command, through a microphone, from a first distance and produce, through a loudspeaker and in response to the speech command, an audible output at a first output level. The apparatus can include one or more proximity sensors, a timer, and one or more processors operable with the one or more proximity sensors and the timer. The one or more processors can be configured to exit a discreet mode of operation by executing the following operations: detecting, from the one or more proximity sensors, removal of an object from a location proximately disposed with a housing of the electronic device, initiating the timer and, upon expiration of the timer, transitioning the voice control interface engine to a second mode operative to receive the speech command from a second distance and produce, in response to the speech command, the audible output at a second output level. As noted above, in one embodiment the second distance is greater than the first distance and the second output level is greater than the first output level.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method comprising:
operating a voice control interface engine of an electronic device in a first mode operative to receive a speech command from a first distance and produce, in response to the speech command, an audible output at a first output level;
monitoring, with one or more processors of the electronic device, one or more proximity sensors to detect an object proximately located with a housing of the electronic device while operating the voice control interface engine in the first mode;
detecting, by the one or more processors from the one or more proximity sensors, removal of the object from the housing of the electronic device;
upon detecting removal of the object, initiating a timer with the one or more processors; and
upon expiration of the timer, causing, with the one or more processors, the voice control interface engine to transition to a second mode operative to receive the speech command from a second distance and produce, in response to the speech command, the audible output at a second output level;
the second distance greater than the first distance and the second output level greater than the first output level.

2. The method of claim 1, the one or more proximity sensors comprising one or more proximity sensor components.

3. The method of claim 2, each proximity sensor component comprising an infrared signal receiver to receive an infrared emission from the object.

4. The method of claim 1, the one or more proximity sensors comprising one or more proximity detector components.

5. The method of claim 1, further comprising:
detecting, by the one or more processors from the one or more proximity sensors, the object or another object proximately located with the housing of the electronic device prior to expiration of the timer; and
continuing operating the voice control interface engine in the first mode.

6. The method of claim 5, the initiating comprising setting the timer to five seconds or less.

7. The method of claim 5, the initiating comprising setting the timer to three seconds.

8. The method of claim 1, further comprising:
receiving, from a user interface, a predefined user input prior to expiration of the timer; and
causing, with the one or more processors, the voice control interface engine to transition to the second mode in response to the receiving the predefined user input.

9. The method of claim 8, the predefined user input comprising a predefined gesture input.

10. The method of claim 1, further comprising redirecting the audible output to a loudspeaker of the electronic device.

11. An apparatus comprising:
a voice control interface engine operative in a first mode to receive a speech command, through a microphone, from a first distance and produce, through a loudspeaker and in response to the speech command, an audible output at a first output level;
one or more proximity sensors;
a timer;
one or more processors operable with the one or more proximity sensors and the timer, the one or more processors to:
  detect, from the one or more proximity sensors, removal of an object from a location proximately disposed with a housing of the apparatus;
  initiate the timer; and
  upon expiration of the timer, transition the voice control interface engine to a second mode operative to receive the speech command from a second distance and produce, in response to the speech command, the audible output at a second output level;
the second distance greater than the first distance and the second output level greater than the first output level.

12. The apparatus of claim 11, the first mode comprising a discreet mode of operation.

13. The apparatus of claim 11, the one or more processors further to detect, with the one or more proximity sensors, the object or another object becoming proximately located with the housing prior to expiration of the timer and, in response, to continue operating the voice control interface engine in the first mode.

14. The apparatus of claim 11, the one or more processors to detect a predefined user input prior to expiration of the timer and, in response, to continue operating the voice control interface engine in the first mode.

15. The apparatus of claim 14, the predefined user input comprising a gesture input.

16. The apparatus of claim 14, the predefined user input comprising a touch input.

17. The apparatus of claim 15, the predefined user input comprising a predefined movement of the apparatus.

18. The apparatus of claim 11, the voice control interface engine operative in the second mode to output the audible output from a second loudspeaker different from the loudspeaker.

19. The apparatus of claim 11, the timer having a timer duration of five seconds or less.

20. The apparatus of claim 11, the one or more proximity sensors comprising each comprising proximity sensor components.

* * * * *